United States Patent [19]

Kennedy et al.

[11] Patent Number: 5,663,234

[45] Date of Patent: Sep. 2, 1997

[54] CATIONIC MULTIBLOCK THERMOPLASTIC ELASTOMERS

[75] Inventors: Joseph P. Kennedy, Akron, Ohio; Bernd Zaschke, Dresden, Germany

[73] Assignee: The University of Akron, Akron, Ohio

[21] Appl. No.: 490,969

[22] Filed: Jun. 15, 1995

[51] Int. Cl.$^6$ .................................................. C08L 77/00
[52] U.S. Cl. ........................... 525/123; 525/183; 525/184
[58] Field of Search ........................... 525/123, 183, 525/184

[56] References Cited

U.S. PATENT DOCUMENTS

| | | | |
|---|---|---|---|
| 4,061,622 | 12/1977 | Onder . | |
| 4,094,864 | 6/1978 | Onder . | |
| 4,129,715 | 12/1978 | Chen et al. | 528/67 |
| 4,156,065 | 5/1979 | Onder et al. | 528/51 |
| 4,346,200 | 8/1982 | Woodbrey | 525/421 |
| 4,845,158 | 7/1989 | Peters | 525/354 |

OTHER PUBLICATIONS

Wondraczek and Kennedy. *J. Poly. Sci.* "Nylon 6–Polyisobutylene Sequential Copolymers. II. Synthesis, Characterization, and Morphology of Di-, Tri-, and Radial Block Copolymers". vol. 20, pp. 173–190 (1982).

Wondraczek and Kennedy. *Polymer Bulletin.* "Synthesis and Characterization of Nylon–Polyisobutylene–Nylon Triblock Copolymers, I. Preliminary Studies". vol. 2, pp. 675–682 (1980).

Speckhard, Gibson, Cooper, Chang and Kennedy. *Polymer,* 1985. "Properties of Polyisobutylene Polyurethane Block Copolymers: 2. Macroglycols Produced by the 'Inifer' Technique". vol. 26, pp. 55–69.

Speckhard, Hwang, Cooper, Chang and Kennedy. *Polymer,* 1985. "Properties of Polyisobutylene Polyurethane Block Copolymers: 3. Hard Segments Based on 4,4'-dicyclohexylmethane diisocyanate ($H_{12}MDI$) and Butane Diol". vol. 26, pp. 70–78 (1985).

Walch and Gaymans, *Polymer.* "Synthesis and Properties of Poly(butylene terephthalate)–b–polyisobutylene Segmented Block Copolymers". vol. 35, pp. 636–641. (1994).

Kennedy and Kurian. *J. Poly. Sci.* "Living Carbocationic Polymerization of p–Halostyrenes. III. Syntheses and Characterization of Novel Thermoplastic Elastomers of Isobutylene and p–Chlorostyrene". vol. 28, pp. 3725–3738 (1990).

Puskas, Kaszas, Kennedy and Hagar. *J. Poly. Sci., Poly Chem.,* "Polyisobutylene–Containing Block Polymers by Sequential Monomer Addition. IV. New Triblock Thermoplastic Elastomers Comprising High $T_g$ Styrenic Glassy Segments: Synthesis, Characterization and Physical Properties", vol. 30, pp. 41–48 (1992).

Baldwin, Fusco and Gastwirt. *Adhesives Age,* "Elastomeric Prepolymers for Adhesives and Sealants Provide Improved Strength and Versatility". vol. 10, pp. 22–29 (1967).

Faust. *Macromol. Symp.,* "Synthetic Strategies to Well–Defined Polymers by Ionic Polymerization". vol. 85, pp. 295–306 (1994).

Kennedy and Hiza, *J. Poly. Sci.,* "New Telechelic Polymers and Sequential Copolymers by Polyfunctional Initiator–Transfer Agents (Inifers). XXX. Synthesis and Quantitative Terminal Functionalization of α,ω–Diarylpolyisobutylenes". vol. 21, pp. 3573–3590 (1983).

Ivan, Kennedy, and Chang. *J. Poly. Sci.* "New Telechelic Polymers and Sequential Copolymers by Polyfunctional Initiator–Transfer Agents (Inifers). VII. Synthesis and Characterization of α,ω–Di(hydroxy)polyisobutylene". vol. 18, pp. 3177–3191 (1980).

Kennedy, Chang, Smith and Ivan. *Polymer Bulletin.* "New Telechelic Polymers and Sequential Copolymers by Polyfunctional Initiator–Transfer Agents (Inifers). V. Synthesis of α–tert–Butyl–ω–isopropenylpolyisobutylene and α,ω–Di(isopropenyl)polyisobutylene". vol. 1, pp. 575–580 (1979).

Chen, Kaszas, Puskas, and Kennedy. *Polymer Bulletin.* "Living Carbocationic Polymerization XXXIII. Living Polymerization of Isobutylene by tertiary hydoroxyl/boron trichloride/electron Pair Donor Systems". vol. 22, pp. 463–470. (1989).

Nemes, Peng, Wilczek and Kennedy. *Polymer Bulletin.* "Oxyethylation and Carbonation of Telechelic Polyisobutylene Anions". vol. 24, pp. 187–194 (1990).

(List continued on next page.)

*Primary Examiner*—Ana Woodward
*Attorney, Agent, or Firm*—Renner, Kenner, Greive, Bobak, Taylor & Weber

[57] ABSTRACT

The synthesis and characterization of a series of novel $(AB)_n$ multiblock copolymers, typically thermoplastic elastomers, containing polyisobutylene as the soft phase and polyamides as the hard phase are described. First, carboxyl ditelechelic polyisobutylene prepolymers and isocyanate ditelechelic polyisobutylene prepolymers were synthesized, both of which were subsequently reacted under solution polycondensation conditions with dicarboxylic acids and diisocyanates. The melting points of the polyamide hard phases were in the 223°–284° C. range. The decomposition temperatures (296°–337° C.) in air and nitrogen of these thermoplastic elastomers were quite similar; in contrast, these properties of polytetrahydrofuran-based thermoplastic elastomers are noticeably lower in air. Melt processing of these novel polyisobutylene-based thermoplastic elastomers is possible.

13 Claims, 1 Drawing Sheet

OTHER PUBLICATIONS

Kaszas, Puskas, Kennedy and Hagar, *J. Poly. Sci. Poly. Chem. Ed.* "Polyisobutylene–Containing Block Polymers by Sequential Monomer Addition. II. Polystyrene–Polyisobutylene–Polystyrene Triblock Polymers: Synthesis, Characterization, and Physical Properties". vol. 29, pp. 427–435.

Janik, Walch and Gaymans, *Polymers*. "Ruthenium Tetroxide Staining of Polybutylene Terephthalate (PBT) and Polyisobutylene–b–PBT Segmented Block Copolymers". vol. 33(16), pp. 3522–3524 (1992).

Jacobi, Schuttenberg and Schulz, *Makromol. Chem. Rapid Communication*, "A New Method for Gel Permeation Chromatography of Polyamides", vol. 1, pp. 397–402 (1980).

Liao and Kennedy, *Polymer Bulletin*, "New Telechelic Polymers and Sequential Copolymers by Polyfunctoinal Initiator–transfer Agents (Inifers) 15. Synthesis and Characterization of Telechelic Acid–ester Polyisobutylenes". vol. 5, pp. 11–18 (1981).

Speckhard, Ver Strate, Gibson and Cooper, *Polymer Engineering Science*, "Properties of Polyisobutylene–Polyurethane Block Copolymers: I. Macroglycols from Ozonoloysis of Isobutylene–Isoprene Copolymer". vol. 23(6), pp. 337–349 (1983).

Baldwin, "Modifications of Low Functionality Elastomers", 115th Chemical Society Meeting, Rubber Division, Atlanta, Georgia, Mar. 27–30 (1979).

CATIONIC MULTIBLOCK THERMOPLASTIC ELASTOMERS

TECHNICAL FIELD

The invention described herein pertains generally to multiblock thermoplastic elastomers prepared by cationic polymerization.

BACKGROUND OF THE INVENTION

A body of literature exists on the synthesis and properties of polyisobutylene (PIB) based linear and three arm star thermoplastic elastomers (TPE) containing a variety of hydrocarbon hard phases with $T_g$'s or in one case/$T_m$ in the 100°–240° C. range. However, there is a lack of information on related (AB)$_n$-type multiblocks comprising rubbery PIB blocks connected to glassy or crystalline segments. Only PIB multiblocks with polyurethane and polybutyleneterephthalate hard phases have been described. There does not appear to be any discussion regarding the synthesis of (AB)$_n$ type multiblock thermoplastic elastomers with polyisobutylene (PIB) soft segments connected to polyamide (PA) hard segments. Polyamides promise to yield desirably high melting crystalline blocks (mp=220°–280° C.) coupled with improved thermal and chemical environmental resistance, melt processability, at reasonably low cost.

SUMMARY OF THE INVENTION

In accordance with the present invention, there is provided a series of novel cationic thermoplastic elastomers and processes by which cationic multiblock thermoplastic elastomers can be synthesized.

It is an object of this invention to provide the synthesis of (AB)$_n$ type multiblock thermoplastic elastomers with polyisobutylene soft segments connected to polyamide hard segments.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Figure 1:
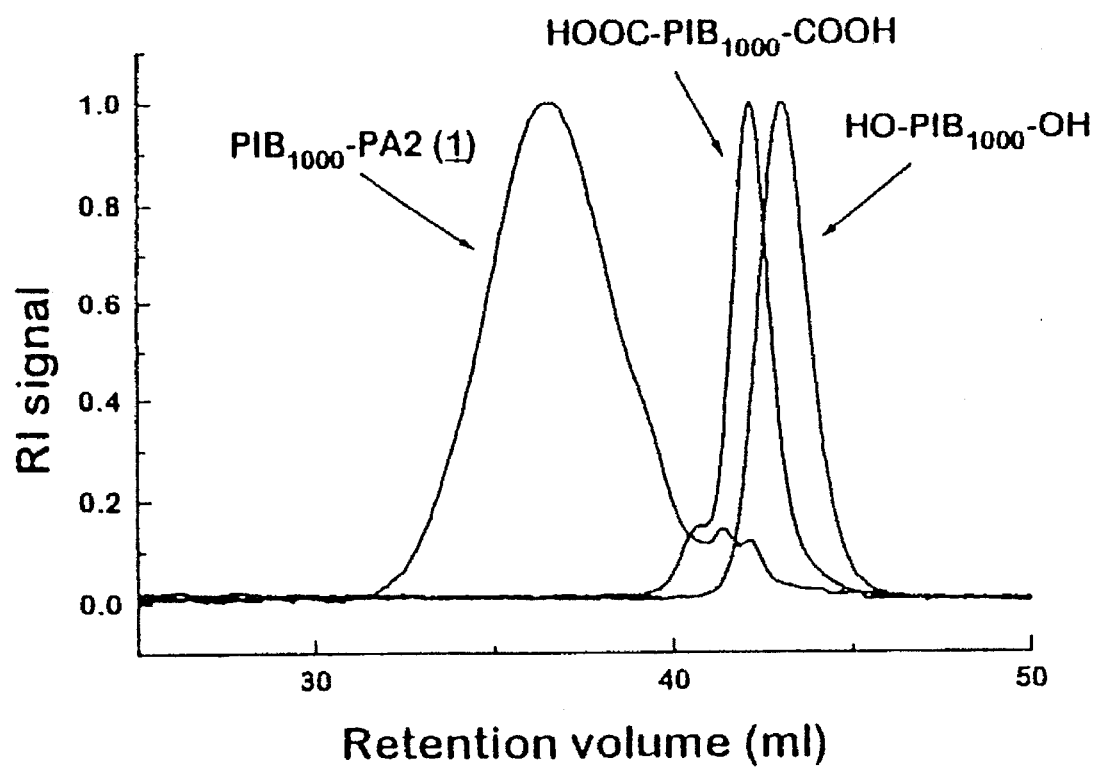
FIG. 1 shows gel permeation curves of HO-PIB$_{1000}$-OH, HOOC-PIB$_{1000}$-COOH and PIB$_{1000}$-PA2.

Referring now to the drawings wherein the showings are for purposes of illustrating the preferred embodiment of the invention only and not for purposes of limiting the same, the Figures show the successful synthesis of multiblock thermoplastic elastomers prepared by cationic polymerization.

The best mode for carrying out the invention will now be described for the purposes of illustrating the best mode known to the applicant at the time. The examples are illustrative only and not meant to limit the invention, as measured by the scope and spirit of the claims.

Synthetic Strategy

Several alternatives for the synthesis of (PIB-PA)$_n$ multiblocks were tried. In view of the immiscibility of nonpolar polyisobutylene and polar polyamide ditelechelic prepolymers in the melt, the solution polycondensation of HOOC— or OCN— terminated ditelechelic polyisobutylenes with various diisocyanates and dicarboxylic acids were found to be effective. Equations #1 and #2 diagram the pathways for the synthesis of (PIB-PA) multiblocks.

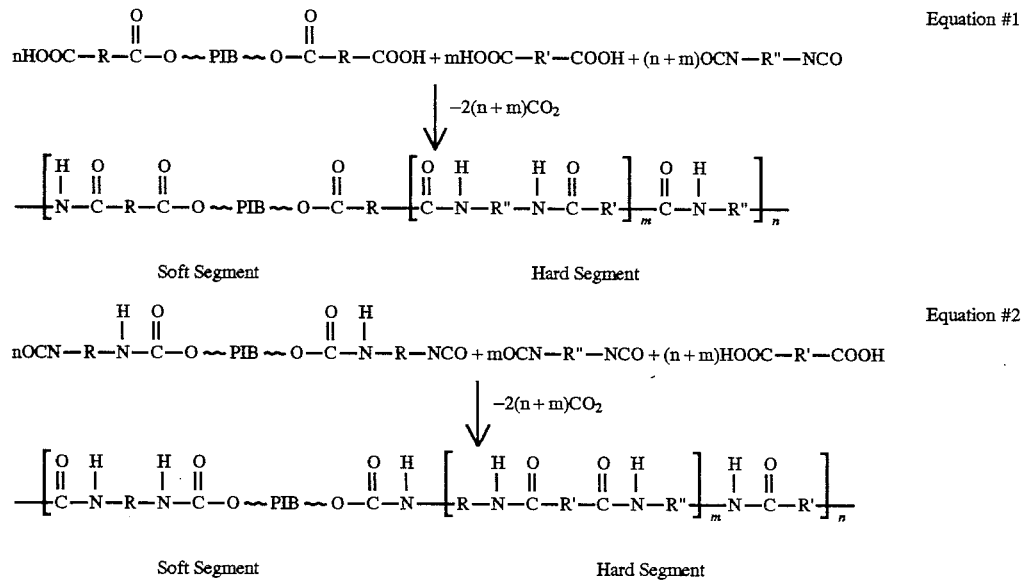

Experiments showed that all the envisioned polar and nonpolar reactants could be dissolved in mixed solvent systems such as tetramethylenesulfone (TMS)/xylene, γ-butyrolactone/xylene and TMS/o-chlorobenzene at elevated temperature. The boiling points of these solvent systems were above 150° C., a desirable temperature for polycondensation reactions. Various catalysts were determined to be effective in accelerating the polycondensation reaction and included 1,3-dimethyl-3-phospholene-1-oxide, 1,3-dimethyl-2-phospholene-1-oxide, CH$_3$ONa, CH$_3$OLi, PhOLi, and lithium-lactamates. Much of the experimental work presented in this application focuses on CH$_3$ONa because of its commercial availability and low cost, however, the application is not limited to this catalyst.

Experimental

Dicarboxylic acids (Aldrich Chemical Co.) were dried in vacuum before use. Diisocyanates (Aldrich Chemical Co. or Pfaltz & Bauer) were used without further purification. The OCN— functionality was checked by back titration with di-n-butylamine followed by HCl. A non-limiting specific list of reagents would include the following dicarboxylic acids and diisocyanates: adipic acid, azelaic acid, 1,4-cyclohexane-dicarboxylic acid (cis and trans), toluene diisocyanate (TDI), p,p-diphenylmethanediisocyanate (MDI), 1,6-diisocyanatohexane (HDI), 1,3-bis-(isocyanatomethyl)-benzene (XDI) and 1,3-bis-(isocyanatomethyl)-cyclohexane (HXDI) (cis and trans). In general, it is expected that all dicarboxylic acids as shown by general formula HOOC—$R_{16}$—COOH would be effective in the reaction, wherein $R_{16}$ is $C_{2-20}$ aliphatic, cycloaliphatic, aromatic, aralkyl or alkaryl moiety, said moiety optionally containing substituents such as halogens. Similarly, it is expected that all diisocyanates as shown by the general formula OCN—$R_{17}$—NCO would be effective in the reaction, wherein $R_{17}$ is defined similarly to $R_{16}$.

Characterization

Molecular weights and molecular weight distribution were determined by using a Waters high pressure GPC instrument equipped with refractive index (RI), ultraviolet (UV) and a three angle light scattering detector (Minidawn by Wyatt Technology Corp.). Five Ultrastyragel columns (100, 500, 1000, 10000, 100000 Å) and THF solutions (injection 100 µL) were used. The calibration curve was obtained with polyisobutylene standards. Because of the strong hydrogen bonds between the amide groups, polyamides are insoluble in THF. However, after N-trifluoroacetylation of the amide groups as shown in Equation #3,

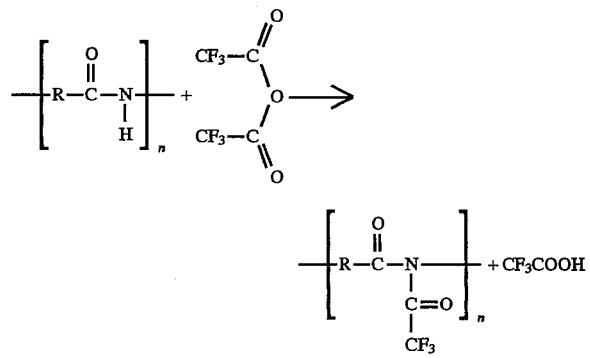

both homopolymers and block copolymers became soluble in THF, rendering GPC and light scattering characterization possible. Thus all of the GPC determinations were carried out by the use of trifluoroacetylated polymer.

$^1$H-NMR

H-NMR spectra were obtained by the use of a Varian Gemini-200 instrument (200 MHz). Sample concentrations were about 20 mg/mL in $CDCl_3$. Typically, 128 transients were accumulated with 60° pulses (18 µs), 2.7 seconds acquisition time, and 4 seconds delay.

$^{13}$C-NMR

Sample concentration 300 mg/mL in $CDCl_3$, accumulation 12 h.

Differential Scanning Calorimetry (DSC)

A model DSC 2910 Du Pont Instruments, was used with a heating rate of 10° C./min. All the DSC data reflect $2^{nd}$ heating cycle.

Thermal Gravimetric Analysis (TGA)

A Du Pont instruments, 951 Thermogravimetric Analyzer was employed using a heating rate 10° C./min, gas flow 60 mL/min, $N_2$ or air. Decomposition temperature equaled 5% weight loss.

Mechanical Properties

Compression molded sheets were obtained in a Carver press (~20° C. above the melting point of the polyamide moieties, at ~50 kN). Mechanical properties were determined on dumbbells punched from the above sheets by the use of a Monsanto Tensiometer 10, Rate: 50.8 and 508 mm/min.

Preparation of Soft Segment Prepolymers (a) HO-PTHF-OH

Hydroxyl ditelechelic PTHF (Aldrich Chemical Co.) was used without further purification. Product characteristics are shown in Table 1. The subscripts in the symbols in the column headings indicate the number average molecular weight ($M_n$) of the polyisobutylene or polytetrahydrofuran segments.

(b) HO-PIB-OH

Hydroxyl ditelechelic polyisobutylenes were prepared by a well established procedure shown below in Equation #4.

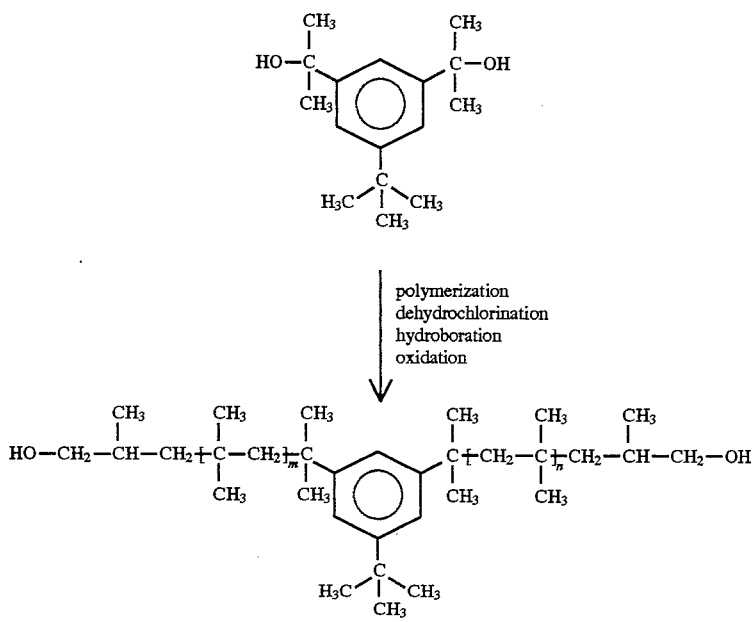

The aim was to prepare prepolymers of $M_n \approx 1000$ and $\approx 2000$ g/mol, narrow molecular weight distributions, and capped by exactly two terminal HO-groups ($F_N$=number average terminal functionality=2.0±0.05). According to $^{13}$C-NMR spectroscopy Shown in Table 1, this degree of functionality was achieved. The $T_g$'s of the rather low molecular weight products, −49° and −61° C., are higher than that of conventional high molecular weight polyisobutylene (−73° C.), most likely because of the relative large initiator fragment (216 g/mol) in the statistical middle of the short polyisobutylene chain. Molecular characterization data of the HO-PIB-OH product are summarized in Table 1.

While only one initiator is shown in the above equation, it is known that other initiators are effective in the polymerization of polyisobutylene with at least two functional groups attached thereto. In fact, initiators of the following generic formula:

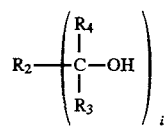

would also be effective in the polymerization of isobutylene. In the above Markush formula, exemplary non-limiting definitions would include:

$R_2=C_{1-24}$ alkyls, halogenated alkyls, aryl having from 1 to 4 phenyl rings, either noncondensed such as phenyl, biphenyl or terphenyl or condensed rings such as naphthalene, anthracene, phenathrene or pyrene.

In a preferred embodiment, $R^1$ is aryl or substituted aryl according to the following formulas

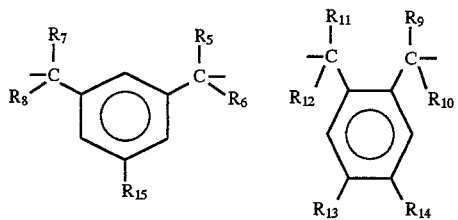

wherein the substituents $R_5$–$R_{12}$ are independently hydrogen or alkyl groups having from $C_{1-5}$ and $R_{13-15}$ are independently hydrogen or alkyl groups having from $C_{1-5}$ carbons or cycloalkyl groups having from $C_{4-8}$;

$R_3$=hydrogen, methyl or phenyl;

$R_4$=can independently be the same or different from $R_3$; and i=an integer which is at least 2, and in a preferred embodiment, i=2.

TABLE 1

| Property | Characteristics of Hydroxyl Ditelechelic Prepolymers | | |
|---|---|---|---|
| | HO-PTHF$_{1000}$-OH | OH-PIB$_{1000}$-OH | OH-PIB$_{2000}$-OH |
| $M_n$ [g/mol] ($^{13}$C-NMR) | 1000 | 975 | 1950 |
| $M_n$ [g/mol] ($^1$H-NMR) | 930 | 1060 | 2140 |
| HO-$F_n$ ($^1$H-NMR & $^{13}$C-NMR) | | 1.97 | 1.98 |
| $M_w/M_n$ (GPC) | 1.535 | 1.057 | 1.036 |
| $T_g$ or $T_m$ (°C.) | $T_m$:23 | $T_g$:−49 | $T_g$:−61 |
| Decomposition temp (°C.) in $N_2$ | 274 | 358 | 382 |

(c) HOOC-PTHF-COOH

The following reaction (equation #5) was employed to synthesize this carboxylic acid terminated polytetrahydrofuran reactant.

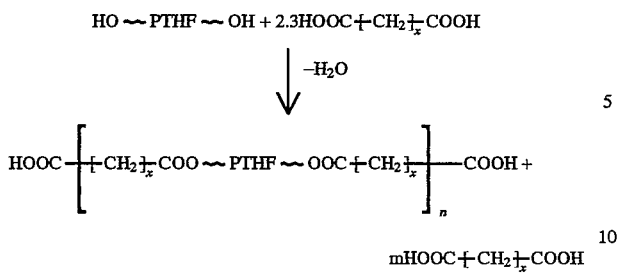

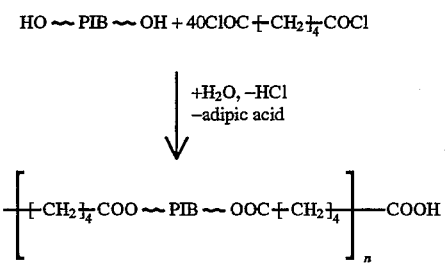

The advantage of this route is that the product can be used in subsequent polycondensations without prior purification since the unreacted adipic and azelaic acid (wherein x is 4 and 7 respectively) is consumed during polyamide formation. $^1$H and $^{13}$C NMR analyses showed that the terminal hydroxyl groups were quantitatively converted. Table 2 shows the data collected in summary form.

(d) HOOC-PIB-COOH

Efforts to adapt the route used for the synthesis of HOOC-PTHF-COOH (see above) for the preparation of HOOC-PIB-COOH were relatively unsuccessful because of excessive foaming, and even after three (3) days of refluxing using a Dean-Stark apparatus, only 56% of the hydroxyl groups had reacted. In a preferred embodiment, a large excess (40×) of adipoyl chloride was used to suppress chain extension according to the following reaction scheme (equation #6).

THF solvent was determined to consume approximately 2-5% of the polyisobutylene end groups, probably due to the following side reaction (equation #7).

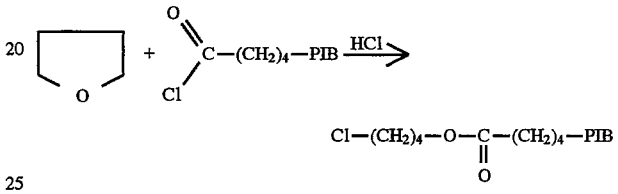

By substituting benzene for THF this side-reaction was avoided and useful products were obtained. After removing the excess adipic acid, water, and pyridine, $^1$H-NMR, $^{13}$C-NMR and GPC characterizations indicated satisfactory end-functionalization and the formation of only a small amount (8-10%) of chain extended product. Table 2 summarizes characterization data.

TABLE 2

Molecular weight, Molecular weight distribution and Composition of carboxyl ditelechelic prepolymers

| Prepolymer | Prep. by | $M_n$ ($^{13}$C-NMR$^{(a)}$) (g/mol) | $M_w/M_n$ (GPC) | Product comp. GPC traces (%) | HOOC-$F_n$ |
|---|---|---|---|---|---|
| HOOC-PTHF $_{1000}$-COOH | Eq. #5 | N.A. | 1.78 | broad trace | ~2.0$^{(b)}$ |
| HOOC-PIB $_{2000}$-COOH | Eq. #6 | 2200 | 1.04 | 92 | 1.93-1.95 |
| | | 4270 | 1.03 | 8 | |
| HOOC-PIB $_{1000}$-COOH | Eq. #7 | 1230 | 1.07 | 90 | 1.93-1.95 |
| | | 2320 | 1.04 | 10 | |

(e) OCN-PIB-NCO

The target isocyanate ditelechelic polyisobutylene employed in synthesis by Equation #2, was prepared by reaction HO-PIB-OH with excess MDI (equation #8).

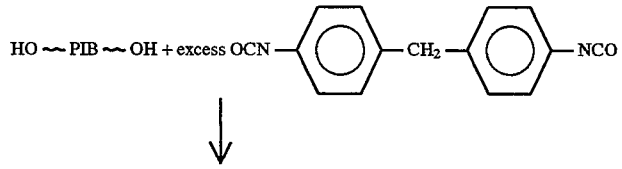

-continued

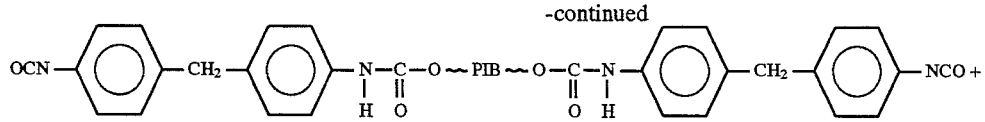

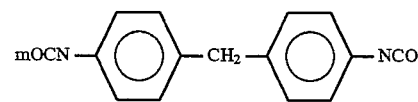

Table 4 shows the reagent stoichiometries employed. After removing the solvent, the products were used in polycondensations without further purification. Depending on the HO-PIB-OH/MDI ratio, the products contained different amounts of chain extended HB and unreacted MDI. Table 3 provides this information, generated by GPC (RI) eluograms. In the course of the polycondensation the excess MDI is consumed and gives the hard PA phase.

A typical synthesis was carried out as follows: Under a blanket of nitrogen in a four neck flask equipped with a magnetic stirrer, pressure equalized dropping funnel, thermometer and a reflux condenser, a solution of the diisocyanate in THF (dried over $CaH_2$) was added to a solution of the HO-PIB-OH in dry THF. Table 4 shows the HO-PIB-OH/MDI ratio used. The mixture was refluxed for 2.5 hours and after removing the THF by vacuum, diisocyanate telechelic prepolymer was obtained.

TABLE 3

Composition if isocyanate ditelechelic polyisobutylenes
(Characterization by GPC; % values calculated from RI - signal area)

| Products | un-reacted MDI | OCN-PIB-NCO | once chain extended | twice chain extended | three times chain extended |
|---|---|---|---|---|---|
| Eq. #8 | m | n = 1 | n = 2 | n = 3 | n = 4 |
| OCN-PIB$_{1000}$-NCO(1) | 2.4 | 20.1 | 27.4 | 50.1 | |
| OCN-PIB$_{1000}$-NCO(2) | 4.1 | 21.7 | 21.7 | 16.5 | 36 |
| OCN-PIB$_{1000}$-NCO(3) | 48.3 | 48 | 3.7 | | |
| OCN-PIB$_{1000}$-NCO(4) | 47.3 | 47.8 | 5.9 | | |
| OCN-PIB$_{1000}$-NCO(5) | 43.7 | 56.3 | | | |

Polycondensation

Synthesis of polyamides (PA), and (PTHF-PA)$_n$ and (PIB-PA)$_n$ multiblocks by Equation #1

The synthesis of polyamides, (PTHF-PA)$_n$ and (PIB-PA)$_n$ according to equation #1 were carried out using a solution polycondensation reaction. The syntheses of the PA- and the PTHF- based multiblocks were carrier out in tetramethylenesulfone (TMS). Because of the simultaneous use of polar and nonpolar reactants in the (PIB-PA)$_n$ synthesis, polar/nonpolar solvent mixtures, such as TMS/xylene were employed. Polycondensation conditions are described in Table 4.

A typical polycondensation was carried out under a blanket of nitrogen in a four neck flask equipped with a magnetic stirrer, pressure equalized dropping funnel and thermometer. Solvents were dried over $CaH_2$ and distilled under a blanket of $N_2$. The carboxyl ditelechelic PIB, the low molecular weight dicarboxylic acids, and about 20 mg $NaOCH_3$ were dissolved in xylene/TMS (60:40 up to 75:25 vol.%) under stirring and heating. At the preselected temperature, a solution of diisocyanate in xylene/TMS (50:50 up to 0:100 vol.%) was added dropwise (70% of the diisocyanate during the first two hours, 80% after three hours, and then slowly dropwise until completion). The reaction was accompanied by gas evolution. After the reaction was completed, the charge was precipitated into acetone. After 12 hours the precipitate was filtered, washed for 24 hours in methanol under stirring, filtered and vacuum dried for five days at 60° C.

Synthesis of (PIB-PA)$_n$ by Equation #2

The polycondensation was carried out under a blanket of nitrogen in the same reaction vessel used for the synthesis of OCN-PIB-NCO prepolymer. After addition of the low molecular weight dicarboxylic acids (NCO:COOH=1:1.08), ~20 mg $NaOCH_3$ were added, xylene/TMS (65:35 vol.%), and the charge was quickly heated to the polycondensation temperature. Gas evolution and an increase in viscosity occurred during the heating. Stirring for 4 more hours resulted in a decrease in the viscosity. Subsequently, a solution of MDI in TMS was added over a period of one hour until the desired COOH:NCO was achieved. The product was recovered as described above for the products by Equation #1.

Results and Discussion

The objective of this research was the preparation of novel (PIB-PA)$_n$ multiblock thermoplastic elastomers consisting of thermally stable rubbery polyisobutylene blocks connected to thermally stable crystalline polyamide blocks having melting points in the 220°–280° C. range. This combination of soft and hard moieties yielded good physical-mechanical properties and also melt processability. Thermoplastic elastomers were made by solution polycondensation of HOOC— or OCN— ditelechelic PIB's according to Equation #1 or #2.

Synthesis of Polyamides

To control the melting point of the polyamide moieties, orienting experiments were carried out with various diisocyanates plus different dicarboxylic acid (adipic/azelaic acid) mixtures. The mixtures of adipic and azelaic acids were chosen because the melting point of polyamides made with different proportions of these acids can be readily controlled over the desirable 240°–320° C. range. Data in Table 4 shows reaction conditions and corresponding results (Table 5) for the preparation of various polyamides (PA1 to PA5). Assuming that the polymer composition is equivalent to the feed composition (and that all amide groups have been trifluoroacetylated), the value m (see Equation #1) and the average number of amide bonds per chain (2m) can be readily calculated from the molecular weights of the polycondensation products and the starting materials. Column 6 in Table 5 shows the estimated average number of amide bonds per chain (22–97) in the polyamides obtained.

The two melting points of PA1 may be due to crystallites containing unequal proportions of adipic/azelaic acids. This PA exhibited outstanding thermal resistance (5% decomposition at 352° C.). PA2 prepared with CHDA plus MDI melted at 249° C., was only sparingly soluble in TMS, and exhibited a barely acceptable decomposition temperature (274° C.) for melt processing. The solubility characteristics of PA3 and PA4 prepared with "non-linear" diisocyanates (HXDI, XDI) were good, however, their melting points were less than desirable and exhibited poor crystallization behavior (i.e., after the first melting repeated heating/cooling cycles by DSC gave irreproducible melting point readings). PA5 obtained with adipic acid plus HDI formed in excellent yield, was of high molecular weight, exhibited acceptable melting point, and showed excellent thermal resistance. The repeat structures of PA5 and nylon-6,6 are, necessarily identical, however our PA exhibits mp=232° C. (in contrast to commercial nylon-6,6 with mp=265° C.) most likely because of the molecular weight of the former is lower than the conventional material. According to these experiments PA1 and PA5, because of their relatively high melting points and excellent thermal resistance, appear suitable to provide the hard phases in (PIB-PA)$_n$ multiblock copolymers.

Multiblock Syntheses by Equation #1

(PIB-PA)$_n$ were synthesized by reacting HOOC-PIB-COOH plus dicarboxylic acids with stoichiometric amounts of diisocyanates (small excess). Since the prepolymers were prepared by Equation #5 or #6, the hard/soft phase boundary in these (PIB-PA)$_n$'s is predominantly formed by ester groups.

The second group of data in Table 4 show respective experimental conditions for the synthesis of HOOC-PTHF-COOH and results (Table 5). High yields of pale yellow high molecular weight products were obtained with melting points at 194° and 226° C. The products were thermally quite stable in nitrogen, however, in air at ~150° C., they started to gain weight (~1.5%) indicating the onset of oxidation. At ~280° C., significant decomposition accompanied by heat evolution and weight loss (burning) occurred. According to these observations, the oxidative resistance of PTHF-based TPE's are less than satisfactory than that achieved using PIB-based TPE's.

The third group of data in Table 4 show the conditions and results of experiments carried out with HOOC-PIB-COOH. Reasonable to high yields (69–94%), high molecular weights, and desirably high melting points (from 223° to 284° C.) products were obtained. The two melting points exhibited by PIB$_{2000}$PA1(1) are most likely due to crystallites with different adipic/azelaic acid ratio. The same phenomenon has been obs representative GPC traces obtained in the course of the synthesis of PIB$_{1000}$-PA2(1) (see Table 4). The molecular weight of the HOOC-PIB$_{1000}$-COOH prepolymer (see Table 2) is shifted to somewhat higher values (lower elution counts) relative to the HO-PIB$_{1000}$-OH starting material on account of the two additional adipic acid units. The small peak of the HOOC-PIB$_{1000}$-COOH trace indicates the presence of ~10% chain extended material. The large broad peak of the PIB$_{1000}$-PA2 (1) shifted to higher molecular weights relative to the prepolymers and the two small peaks in the 41–42 elution count range suggest a contribution by lower molecular weight components.

The samples were also characterized by light scattering (LS). Polymers with M$_n \geq$ 15000 g/mol gave good signals and the molecular weight data obtained by LS and GPC were in reasonable agreement.

The values for n and m in Equation #1 (n=average number of PIB segments per chain; m=average number of hard segment repeating units which can be controlled by the HOOC-PIB-COOH/HOOC—R'—COOH ratio) can be calculated by assuming that the charge and product compositions are equal (or equivalent at less than complete conversions). From n and m, the average number of amide bonds formed per chain; n(2m+2), can be calculated. Columns 4–6 in Table 5 show the data according to which the number of amide bonds in (PIB-PA)$_n$'s prepared by Equation #1 were in the 23–41 range.

PIB$_{2000}$-PA2(1) was crosslinked because of the relatively large quantity of diisocyanate employed (the sum of —COOH/NCO ratio was 3.92:4.61 (or 1:1.17) (see Table 4). Crosslinking was due to the formation of acyl urea groups —N(—CO—NH—)—CO— which, however, could be dissolved by stirring the product for 48 hours at 80° C. in a mixture of xylene/dimethylformamide (DMF)/di-N-butylamine (54/43/3 vol. %). The final product (bimodal by GPC) contained ~7% crosslinked material. The products swelled in THF, CH$_2$Cl$_2$, HCCl$_3$ and xylene at room temperature, however, dissolved (27 g/L) in 90/10 THF/DMF mixtures leaving 2–5% gel. The gels could be solubilized after N-trifluoroacetylation which suggests that this fraction consisted mainly of polyamides and/or products with high polyamide contents.

The T$_g$'s of the PIB$_{2000}$-PA and PIB$_{1000}$-PA multiblocks were −49° C. and ~18° C., respectively, which is much higher than that of the HO-PIB-OH starting materials. This T$_g$ elevation occurs because of the relatively low molecular weights (M$_n$=1950 and 975 g/mol) of the soft segments (decreasing free volume in the multiblocks). The T$_g$ of a PIB-based polyurethane made with HO-PIB-OH of M$_n$=1800 g/mol also exhibited T$_g$=−49° C. The T$_g$ of the soft phase could be decreased by increasing the length of the polyisobutylene chain or by using polyisobutylene prepolymers containing no aromatic initiator fragments. Importantly, all the PIB-PA(1)'s exhibited satisfactorily high melting points and high decomposition temperatures (excellent thermal stability) both in N$_2$ and air (see Table 4). This is contrast to PTHF-based thermoplastic elastomers which showed noticeably lower decomposition temperatures in air. Limited stress/strain data with PIB$_{1000}$-PA2 (1) was obtained. Dumbbells punched from compression molded transparent slightly yellow sheets gave the following data (averages of 3 determinations) 17 MPa tensile strength and 84% elongation at 508 mm/min, and 14 MPa with 102% elongation at 50.8 mm/min. The low elongation, due to the relatively short effective polyisobutylene segments could be enhanced by the use of higher molecular weight polyisobutylenes.

Multiblock Syntheses by Equation #2

Multiblock copolymers were obtained by the condensation of diisocyanate telechelic prepolymers with low molecular dicarboxylic acids. The prepolymers were OCN-PIB-NCO (partly chain extended) contained some unreacted MDI (see Table 3). Since the prepolymers are formed by the reaction of HO-PIB-OH with MDI (eq 8), the multiblock copolymers contain urethane bonds at the hard/soft phase boundary. Prepolymer synthesis and the polycondensation were carried out in one-pot. As the reaction mixture was heated to 150° C., crosslinking by allophanate groups —N(—CO—NH—)—CO—O— caused the viscosity to increase significantly, which impeded stirring and reduced the yield. Since the allophanate bond is thermally unstable and starts to release isocyanate groups above 150° C., the viscosity of the charge decreased upon further heating.

As shown by the first two lines of the fourth group of data, the HO-PIB-OH: MDI ratio for the synthesis of the prepolymers OCN-PIB$_{1000}$-NCO was 1:1.92 or 1.79 (see Table 4). Strongly chain extended prepolymers containing only a small amount of free MDI (see Table 3) were obtained and only a small amount of polyamide hard phase was formed during the polycondensation. According to DSC, PIB$_{1000}$-

PA1(2) and PIB$_{1000}$-PA2 (2) exhibited only one T$_g$ at −4° and −8° C., respectively. They are not phase separated.

By increasing the HO-PIB-OH: MDI ratio to 1: 4:21–5.31 (see lines 3–5 of this group of data in Table 4), low M$_n$ prepolymers which contained 40 to 50% unreacted MDI were obtained (see Table 3). Hard phase formation was sufficient for good phase separation and the multiblocks exhibited a T$_g$ in the −21° to −28° C. range, (quite similar to the low T$_g$'s obtained with products prepared by Equation #1) and depending on the adipic/azelaic acid ratio used, a polyamide melting point in the 230° to 279° C. range. The thermostability of the products was adequate albeit somewhat lower (because of the urethane groups) than those prepared by Equation #1.

Novel (AB)$_n$-multiblock thermoplastic elastomers consisting of polyisobutylene soft phases and polyamide hard phases were synthesized as outlined by Equations #1 and #2. Syntheses by Equation #1 led to high yields and gave high melting polyamide phases. By varying the structure of the polyamide it was possible to adjust the melting points of the hard phase in the range of 223°–284° C. The polymers are thermostable in N$_2$ and in air up to 296°–337° C., and they are melt processable. Compression molding yielded pale yellow transparent and tough sheets. It is anticipated that the use of higher molecular weight polyisobutylene prepolymer would decrease the T$_g$ of the soft phase and would improve the mechanical properties, particularly that of elongation.

The synthesis of the diisocyanate telechelic prepolymers (Equation #8) and the subsequent polycondensation according Equation #2 were carried out in one-pot. The products were thermostable up to 267°–298° C. under nitrogen. Because the polycondensation according Equation #2 is complicated by temporary allophanate crosslinking, Equation #1 appears to be the better alternative at this time, for the preparation of (PIB-PA)$_n$ thermoplastic elastomers.

TABLE 4

Reaction Conditions & Yield

| Product | Dicarboxylic acid | Diisocyanate | Prepolymer | Dicarboxylic acid | Diisocyanate | hard phase charged (wt %) | Time (hrs) | Temp (°C.) | Yield (%) |
|---|---|---|---|---|---|---|---|---|---|
| *Homopolyamides* | | | | | | | | | |
| PA1 | Adipic/Azelaic$^c$ | MDI | 0 | 1 | 1.07 | 100 | 5.5 | 170 | 77 |
| PA2 | CHDA | MDI | 0 | 1 | 1.08 | 100 | 3 | 170 | 72 |
| PA3 | Adipic/Azelaic | HXDI | 0 | 1 | 1.08 | 100 | 5 | 170 | 28 |
| PA4 | Adipic/Azelaic | XDI | 0 | 1 | 1.08 | 100 | 5 | 170 | 82 |
| PA5 | Adipic | HDI | 0 | 1 | 1.08 | 100 | 5 | 170 | 98 |
| *Multiblock copolymers from HOOC-PTHF-COOH* | | | | | | | | | |
| PTHF$_{100}$$^b$-PA1(1)$^a$ | Adipic/Azelaic | MDI | 1 | 0.3 | 1.4 | 40 | 5.5 | 170 | 84 |
| PTHF$_{1000}$-PA2(1) | Adipic/Azelaic | MDI | 1 | 2.04 | 3.28 | 58 | 5.5 | 170 | 96 |
| *Multiblock copolymers from HOOC-PIB-COOH* | | | | | | | | | |
| PIB$_{2000}$-PA1(1) | Adipic/Azelaic | MDI | 1 | 3.13 | 4.48 | 35 | 8.5 | 160 | 75 |
| PIB$_{2000}$-PA2(1) | Adipic | HDI | 1 | 2.92 | 4.61 | 24 | 5.5 | 150 | 94 |
| PIB$_{1000}$-PA1(1) | Adipic/Azelaic | MDI | 1 | 1.27 | 2.45 | 43 | 8 | 150 | 69 |
| PIB$_{1000}$-PA2(1) | Adipic/Azelaic | MDI | 1 | 1 | 2.16 | 40 | 8 | 150 | 91 |
| *Multiblock copolymers from OCN-PIB-NCO - HO-PIB-OH$^g$* | | | | | | | | | |
| PIB$_{1000}$-PA1(2) | Adipic/Azelaic | MDI | 1 | 0.92 | 1.92 | 24 | 5.5 | 144 | 36 |
| PIB$_{1000}$-PA2(2) | CHDA | MDI | 1 | 0.79 | 1.79 | 21 | 5.5 | 144 | 40 |
| PIB$_{1000}$-PA3(2) | Adipic/Azelaic | MDI | 1 | 4.08 | 5.31 | 70 | 5.5 | 150 | 34 |
| PIB$_{1000}$-PA4(2) | Adipic/Azelaic | MDI | 1 | 4.01 | 5.21 | 62 | 5.5 | 150 | 30 |
| PIB$_{1000}$-PA5(2) | Adipic/Azelaic | MDI | 1 | 3.01 | 4.21 | 57 | 5.5 | 150 | 46 |

$^a$parenthetical (1) and (2) indicate the equation # synthesis route
$^b$the subscripts show the M$_n$ of the prepolymers
$^c$adipic/azelaic acid ratio was 30/70 mol % (except in PIB$_{1000}$-PA1(1) and PIB$_{1000}$-PA4(2) (40/60 mol %))
$^d$poor crystallization behavior
$^e$exact melting point not determined because of broad melting peaks and/or small enthalpy of melting
$^f$soft phase content calculated from PIB or PTHF segments
$^g$prepolymer synthesis and polycondensation were carried out in the same flask without prepolymer workup - weighed amounts of prepolymers (molar equivalents are related to HO-PIB-OH.

TABLE 5

Product Characterization

| Product | GPC $M_n$ (g/mol) | $M_w/M_n$ | m in eq. (1) and (2) | n in eq. (1) and (2) | Amide group per chain 2 m or n(2 m + 2) | Soft[f] phase $T_g$ (°C.) | DSC Hard $T_g$ (°C.) | DSC Phase $T_m$ (°C.) | Decomp temp. $N_2$/air (°C.) |
|---|---|---|---|---|---|---|---|---|---|
| Homopolyamides | | | | | | | | | |
| PA1 | 8000 | 1.4 | 15 | — | 30 | — | 103 | 232, 257 | 352/ |
| PA2 | 5800 | 1.43 | 11 | — | 22 | — | 46 | 249 | 274/ |
| PA3 | 7800 | 1.52 | 17 | 0 | 33 | — | 64 | 137[d] | 162/ |
| PA4 | 9300 | 1.64 | 20 | — | 40 | — | 49 | 130[d] | 275/ |
| PA5 | 20200 | 1.57 | 48 | — | 97 | — | 102 | 232 | 305/ |
| Multiblock copolymers from HOOC-PTHF-COOH | | | | | | | | | |
| $PTHF_{1000}$-PA1(1) | 29300 | 1.68 | 0.3 | 17 | 45 | −77 | — | 194[e] | 355/277 |
| $PTHF_{1000}$0PA2(1) | 24800 | 1.75 | 2.04 | 9.5 | 58 | −77 | 66 | 226 | 340/284 |
| Multiblock copolymers from HOOC-PIB-COOH | | | | | | | | | |
| $PIB_{2000}$-PA1(1) | 11800 | 1.37 | 3.13 | 2.8 | 23 | −49 | 107 | 227, 255 | 324/320 |
| $PIB_{2000}$-PA2(1) | 19200 (93%) | 2.35 | 2.92 | 5.2 | 41 | −49 | 108 | 240[e] | 337/337 |
|  | 115000 (7%) | 2.37 | | | | | | | |
| $PIB_{1000}$-PA1(1) | 12700 | 1.37 | 1.27 | 5.8 | 26 | −18 | — | 284 | 310/296 |
| $PIB_{1000}$-PA2(1) | 21400 | 1.7 | 1 | 10 | 40 | −18 | — | 223 | 337/332 |
| Multiblock copolymers from OCN-PIB-NCO - HO-PIB-OH | | | | | | | | | |
| $PIB_{1000}$-PA1(2) | 29200 | 2.07 | | | | −4 | — | — | |
| $PIB_{1000}$-PA2(2) | 23500 | 1.61 | | | | −8 | — | — | 286/ |
| $PIB_{1000}$-PA3(2) | 17500 | 2.12 | | | | −28 | 123 | 230 | 286/ |
| $PIB_{1000}$-PA4(2) | 17800 | 2.13 | | | | −21 | 136 | 279 | 298/ |
| $PIB_{1000}$-PA5(2) | 12800 | 1.81 | | | | −21 | 123 | 234[e] | 267/ |

[a] parenthetical (1) and (2) indicate the equation # synthesis route
[b] the subscripts, show the $M_n$ of the prepolymers
[c] adipic/azelaic acid ratio was 30/70 mol % (except in $PIB_{1000}$-PA1(1) and $PIB_{1000}$-PA4(2) (40/60 mol %))
[d] poor crystallization behavior
[e] exact melting point not determined because of broad melting peaks and/or small enthalpy of melting
[f] soft phase content calculated from PIB or PTHF segments
[g] prepolymer synthesis and polycondensation were carried out in the same flask without prepolymer workup - weighed amounts of prepolymers (molar equivalents are related to HO-PIB-OH.

Thus, in general what has been shown is a multiblock polymer product which comprises a polyisobutylene segment chemically bonded to a polyamide segment wherein the polyisobutylene segment and the polyamide segment form a repeating unit diblock copolymer wherein the diblock copolymer repeats at least two times In a preferred embodiment, the polymer product will have a repeating unit is selected from the group consisting of formula (I)

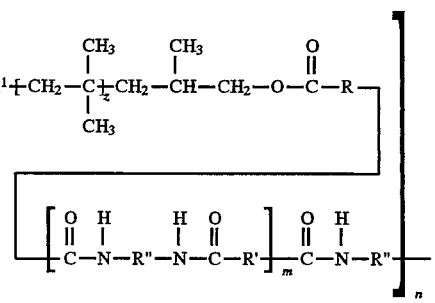

and formula (II)

-continued

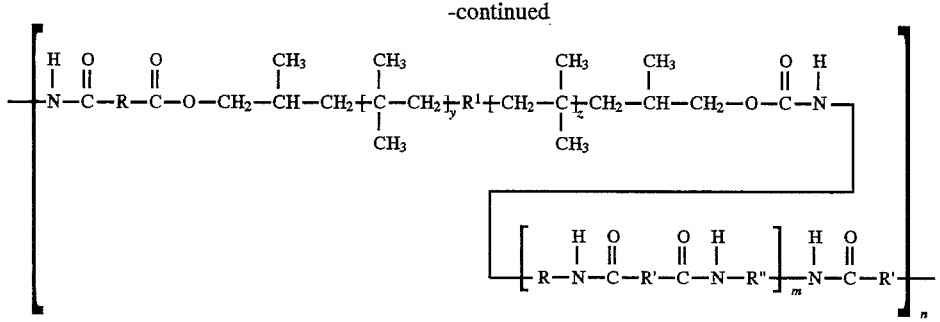

wherein R, R' and R" are independently selected from the group consisting of $C_{2-20}$ aliphatic, cycloaliphatic, aromatic, aralkyl, alkaryl moieties and halogenated derivatives thereof; $R^1$ is an initiator of formula

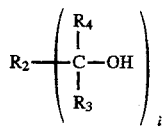

wherein $R_2$ is selected from the group consisting of $C_{1-24}$ alkyls, cycloaliphatic alkyls, aryls having from 1 to 4 phenyl rings, the rings being noncondensed or condensed, and halogenated derivatives thereof; $R_3$ is selected from the group consisting of hydrogen, methyl or phenyl; $R_4$ can independently be the same or different from $R_3$; and i is an integer which is at least 2; m is a number from 1 to 50; n is a number from 2 to 20; y and z are numbers from 9 to 100 and may be the same or different.

In a most preferred embodiment known at the time of this application, the product will have a substituent $R^1$ which is aryl or a substituted aryl

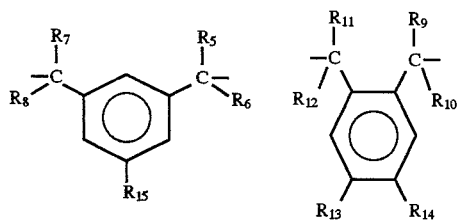

wherein $R_{5-12}$ are independently hydrogen or alkyl groups having from $C_{1-5}$; and $R_{13-15}$ are independently hydrogen or alkyl groups having from $C_{1-5}$ carbons or cycloalkyl groups having from $C_{4-8}$.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A multiblock thermoplastic elastomer comprising:
a polyisobutylene soft segment and a polyamide hard segment; wherein said polyisobutylene segment and said polyamide segment form a repeating unit diblock copolymer that repeats at least two times, and wherein said repeating unit diblock copolymer is selected from the group consisting of formulas (I) and (II)

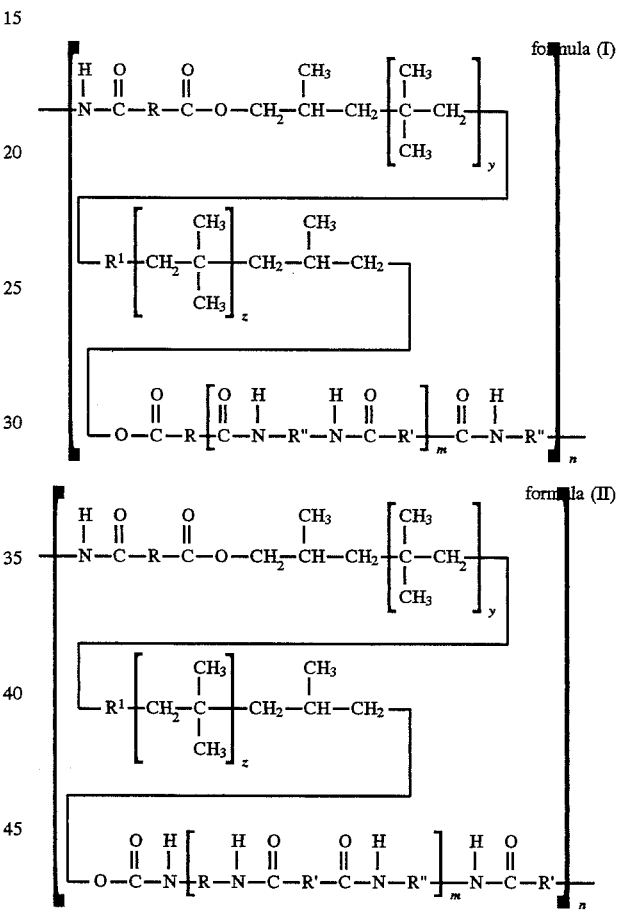

where
R, R' and R" are independently selected from the group consisting of $C_{2-20}$ aliphatic, cycloaliphatic, aromatic, aralkyl, alkaryl moieties and halogenated derivatives thereof;
$R^1$ is an initiator moiety of formula

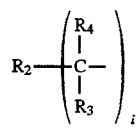

where
$R_2$ is selected from the group consisting of $C_{1-24}$ alkyls, cycloaliphatic alkyls, aryls having from 1 to 4 phenyl rings, the rings being non-condensed or condensed, and halogenated derivatives thereof;
$R_3$ is selected from the group consisting of hydrogen, methyl or phenyl;

$R_4$ can independently be the same or different from $R_3$; and, i is an integer that is at least 2;

m is a number from 1 to 50;

n is a number from 2 to 20;

y is a number from 9 to 100; and z is a number from 9 to 100.

2. The polymer product of claim 1 wherein the repeating unit is selected from the group consisting of formula (I)

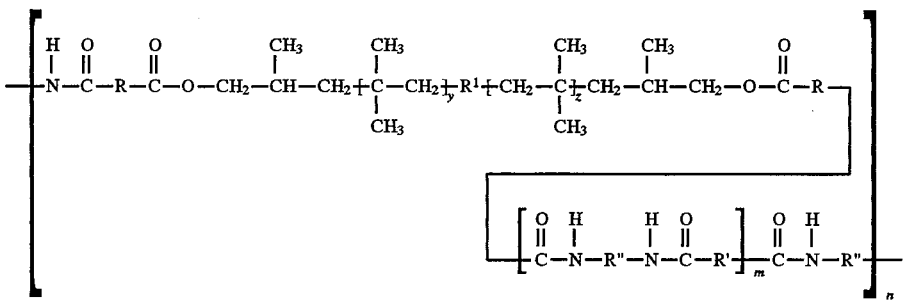

wherein

R, R' and R" are independently selected from the group consisting of $C_{2-20}$ aliphatic, cycloaliphatic, aromatic, aralkyl, alkaryl moieties and halogenated derivatives thereof;

$R^1$ is an initiator of formula

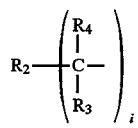

wherein $R_2$ is selected from the group consisting of $C_{1-24}$ alkyls, cycloaliphatic alkyls, aryls having from 1 to 4 phenyl rings, the rings being noncondensed or condensed, and halogenated derivatives thereof;

$R_3$ is selected from the group consisting of hydrogen, methyl or phenyl;

$R_4$ can independently be the same or different from $R_3$; and i is an integer which is at least 2;

m is a number from 1 to 50;

n is a number from 2 to 20;

y is a number from 9 to 100; and z is a number from 9 to 100.

3. The product of claim 1 wherein $R^1$ is aryl or a substituted aryl

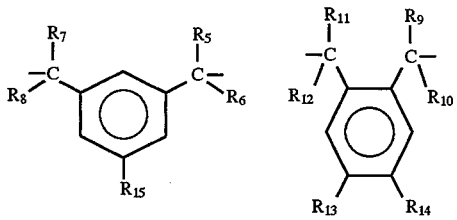

wherein $R_{5-12}$ are independently hydrogen or alkyl groups having from $C_{1-5}$; and $R_{13-15}$ are independently hydrogen or alkyl groups having from $C_{1-5}$ carbons or cycloalkyl groups having from $C_{4-8}$.

4. A process for the preparation for a multiblock polymer product which comprises a polyisobutylene segment chemically bonded to a polyamide segment wherein the polyisobutylene segment and the polyamide segment form a repeating unit diblock copolymer wherein the diblock copolymer repeats at least two times which comprises the steps of:

(a) cationically polymerizing isobutylene using an initiator having at least two functional end-groups which are hydroxide or capable of being converted into hydroxides to form a ditelechelic polyisobutylene;

(b) reacting the end-groups of the ditelechelic polyisobutylene with a dicarboxylic acid to form a carboxyl-terminated ditelechelic polyisobutylene prepolymer;

(c) reacting the prepolymer with at least one dicarboxylic acid in the presence of at least one diisocyanate; and (d) recovering the diblock copolymer.

5. The process of claim 4 which wherein the step of reacting the prepolymer with at least one dicarboxylic acid and at least one diisocyanate occurs in a solvent.

6. The process of claim 5 wherein the solvent is a mixed solvent.

7. The process of claim 6 wherein the mixed solvent has at least one polar solvent and at least one non-polar solvent.

8. A multi-block thermoplastic elastomer prepared by the process of claim 4.

9. A process for the preparation for a multiblock thermoplastic elastomer which comprises a polyisobutylene rubbery segment chemically bonded to a polyamide hard segment wherein the rubbery segment and the hard segment form a repeating unit block copolymer wherein the unit repeats at least two times which comprises the steps of:

(a) cationically polymerizing isobutylene using an initiator having at least two functional end-groups which are hydroxide or capable of being converted into hydroxides to form a ditelechelic polyisobutylene;

(b) reacting the end-groups of the ditelechelic polyisobutylene with a diisocyanate to form a diisocyanate-terminated ditelechelic polyisobutylene prepolymer;

(c) reacting the prepolymer with at least one dicarboxylic acid in the presence of at least one diisocyanate; and (d) recovering the diblock copolymer.

10. The process of claim 9 which wherein the step of reacting the prepolymer with at least one dicarboxylic acid and at least one diisocyanate occurs in a solvent.

11. The process of claim 10 wherein the solvent is a mixed solvent.

12. The process of claim 11 wherein the mixed solvent has at least one polar solvent and at least one non-polar solvent.

13. A multi-block thermoplastic elastomer prepared by the process of claim 9.

* * * * *